United States Patent Office 3,076,033
Patented Jan. 29, 1963

3,076,033
SYNTHESIS OF ALDEHYDES
Lester Friedman, New York, N.Y., assignor of twenty-five percent to Jacob T. Basseches, New York, N.Y.
No Drawing. Original application Dec. 17, 1949, Ser. No. 133,688. Divided and this application Aug. 6, 1958, Ser. No. 755,840
6 Claims. (Cl. 260—598)

This invention relates to a method for the production of aldehydes: more particularly to the production of aldehydes by reduction of organic nitriles and amides. Still more particularly, my invention relates to a discovery of a method of employing a double metal hydride, such as lithium aluminum hydride, to produce by synthesis aldehydes from nitriles and amides.

Known to me is the production of aldehydes by various procedures among which may be enumerated:
 (a) The conversion of nitriles to aldehydes in accordance with the Stephen reduction process;
 (b) The Rosenmund reduction;
 (c) The Weil reduction;
 (d) The Sonn-Mueller reduction;
 (e) The Von Braun reduction.

The Stephen reduction involving the multi-stage treatment is expensive and limited since it cannot be used for preparing unsaturated aldehydes. The Rosenmund reduction which reduces acid chlorides to aldehydes necessitates the use of hydrogen in especially prepared catalysts. The Weil reduction occasionally converts certain aromatic and aliphatic acids to aldehydes but is of limited yield. The Sonn-Mueller and Von Braun reductions equally are disadvantageous from the standpoint of yields and the use of difficultly obtainable ingredients, such as the anhydrous chlorides of tin (II) and chromium (II), respectively.

Known to me too is the employment of the double metal hydride, lithium aluminum hydride for carrying out the reduction of organic compounds. Conditions of bringing these reagents together for reduction, patterned upon the Grignard synthesis, have been found by me to produce almost predictable yields of corresponding amines in the case of the nitriles, and the production of amines in the case of the reaction with amides, where the reduction procedure is effected at room temperatures. With aliphatic compounds, good yields may be obtained at higher temperature, so that, for example, some of the reduction process will serve to produce the alcohols from the corresponding aldehydes.

I have discovered a process for preparing aldehydes from the compounds taken from the group consisting of nitriles and amides by the employment of a reducing agent comprising the double metal hydride of an alkali metal and a metal of group III, more specically, lithium aluminum hydride, sodium borohydride and lithium borohydride. By employing such reducing agents, particularly and specifically lithium aluminum hydride, and a mode of operation which permits stoichiometric additions of the reducing agent described to the compounds to be reduced, that unpredictably and unexpectedly such aldehydes are almost directly produced.

I have also discovered a process of selectively reducing nitriles and amides to effect selective reduction of functional groups of such compounds by employing a reducing agent comprising the double metal hydride of an alkali metal and a metal of group III, more specifically employing lithium aluminum hydride, by a procedure which uniformly combines the compound and reducing agent in a common solvent under conditions of temperature to restrain reaction and under controlled conditions of temperature of stoichiometric additions of the reducing agents described, effect selective reduction formation of aldehydes and other products from nitriles and aldehydes.

I have further found that by making an intimate and relatively uniform admixture of the nitrile and amide with the reducing agent lithium aluminum hydride, preferably in a common solvent, without reaction and particularly at temperatures below reaction, the uniform admixture of the above reducible compounds with stoichiometric amounts of the lithium aluminum hydride forms an initial condition of the components so that upon elevation of the temperature to effect or permit reaction, the ensuing reaction may proceed unexpectedly to produce aldehydes.

More specifically I have discovered that I may prepare aldehydes from nitriles and amides by a reduction thereof with lithium aluminum hydride upon a procedure which effects the introduction of the reducing agent in a suitable common solvent for the nitrile to be reduced, under conditions of intermixing of the nitrile to be reduced and the lithium aluminum hydride.

Still more specifically I have found that the reaction between nitriles and lithium aluminum hydride in a suitable solvent, such as a group of ethers under conditions of control and proportions react to provide excellent yields of the aldehydes of the corresponding compounds of the nitriles.

Still more specifically I have found that by a manner of dissolving the nitriles or amides to be reduced in a solvent, with the double metal hydride of an alkali metal and a metal of group III in a similar solvent, under conditions to restrain reaction until substantially uniform distribution or admixture has been effected, a nitrile hydride complex is synthesized which, upon hydrolysis with dilute acids, liberates the synthesized aldehyde.

With the exceptions hereinafter indicated, complex aldehydes of excellent yield can be prepared, to serve as the intermediate in preparing numerous pharmaceuticals and lengthening the carbon chains of such intermediates.

Essential features and advantages of my process will become more apparent from the exemplifications given hereinbelow.

*Example I.—Preparation of Meta-Hydroxybenzaldehyde*

Meta-hydroxybenzonitrile was prepared from meta-aminophenol. The Sandemeyer synthesis is exemplified. Thereupon the following mixtures were prepared:
 (a) 36 grams of meta-hydroxybenzonitrile were dissolved in 100 milliliters of anhydrous ether. This is effected by employing a flask fitted with stirring means, an addition funnel and reflux condenser and sealed from atmospheric moisture with a calcium chloride drying tube.
 (b) An ethereal solution of lithium aluminum hydride ($LiAlH_4$) was prepared, sufficient to provide .15 mole of the hydride, with due precautions.

Mixture (a) was cooled to 0° C. and the solution of (b) the hydride added thereto while constantly stirring and cooling. When the addition is completed the mixture is allowed to warm up to 25° C., which results in the formation of a white or yellow precipitate, which is the lithium aluminum salt of the aldimine. This exothermic reaction may take from two to fifteen minutes, with the quantities exemplified. Under cooling, the resultant mixture is decomposed with excess dilute hydrochloric acid, 5 to 10%. The ethereal layer is separated, evaporated, recrystallized from an alcohol-water solution to secure 32 grams of metahydroxybenzaldehyde—melting point 102° C. This product is a valuable intermediate in the synthesis of synthetic estrogens.

The sequence for direct admixture so as to add the solution (a) to solution (b) may be effected to secure economical yields by cooling the hydride solution to −20° C. or lower, preferably to −50° C., until the solutions are uniformly and completely mixed, before permitting a rise in temperature.

In a similar manner, by direct or inverse procedure of admixture, salicylaldehyde and para-hydroxybenzaldehyde were in most cases prepared from their corresponding nitriles, the variation in proportions being made in accordance with the mole relationship of the aldehydes mentioned and the available effective reducing component of the hydride employed, that is .25 mole lithium aluminum hydride for the nitrile group in the compound, with an additional amount of .25 mole quantity of the hydride where there are hydroxy (OH) or other active hydrogen groups present.

*Example II.—The Production of Anisicaldehyde*

(a) Ortho-anisonitrile was prepared as in Example I, to form a solution in anhydrous ether and placed in a flask fitted with stirrer, an addition funnel, a reflux condenser and sealed from atmospheric moisture with a calcium chloride drying tube.

(b) A solution in ether was made to provide .25 mole lithium aluminum hydride and cooled below −20° C.

The flask containing the solution (a) of the nitrile was cooled to 0° C. or lower, −5° C., and the lithium aluminum hydride solution then mixed by the direct method as before and stirred vigorously during the sequential addition of the hydride until completely added. The mixture was allowed to warm up to 25° C. with the ensuing action, refluxed to maintain the ether present and then cooled and decomposed with excess dilute hydrochloric acid, 5 to 10% strength, to convert the intermediate imine to the aldehyde. This procedure provides a 97% yield of the anisicaldehyde.

*Example III.—The Production of Propionaldehyde*

55 grams of propionitrile dissolved in 500 milliliters of ether and contained in a flask protected from atmospheric moisture, and fitted with a reflux condenser and with an air seal was provided with a mechanical stirrer. The contents were cooled to 0° C. and within a range −5° C. Thereupon an ether solution of 10 grams of LiAlH$_4$ was added gradually with stirring. After the addition was complete and uniform, the mixture was allowed to warm to 25° C., when exothermic reaction set in, and then decomposed, upon cooling by the addition of an excess dilute hydrochloric acid of from 5 to 10% concentration. The resulting solution was extracted with ether as a continuous extraction set-up and the ethereal extract thus obtained dried over sodium sulphate (Na$_2$SO$_4$), and the mixture fractionally distilled. The fraction collected at 49 to 50° C. was pure propionaldehyde. The yield amounted to 55 grams or 95%.

A sample of the aldehyde was converted to the 2,4-dinitrophenyldrazone by usual procedure, which was found to melt at 153° C., to establish the formation of the propionaldehyde.

*Example IV.—The Production of Benzaldehyde*

(a) Benzonitrile was dissolved in dimethyl Cellosolve to provide the stoichiometric proportions.

Solution (a) was cooled in the flask provided with external cooling means, internal stirring means, a seal, a reflux condenser and an addition funnel. The flask of the solution of the benzonitrile was cooled to within a range from 0 to 5° C. The hydride (b) was added gradually during stirring to maintain the solution to the temperature indicated, until the full amount of the hydride was added. The coolant was removed, to permit a rise in temperature exothermically occurring at about 20 to 30° C. The temperature was maintained below 80° C. until activity ceased in from two to five minutes. Thereafter the temperature was reduced to 25° C. The solution was then decomposed by addition of an excess dilute hydrochloric acid solution of from 5 to 10% concentration. The extraction was effected as in the prior example to yield benzaldehyde, to provide a 96% yield. Its presence was established by conversion of its 2,4-dinitrophenylhydrazone derivative which was found to melt at 235° C.

In the same manner, the ortho-tolunitrile and alpha-nitrile were reduced to the corresponding aldehydes of these ingredients in yields of 98 and 96%, respectively.

*Example V.—The Production of Vitamin A Aldehyde*

Vitamin A nitrile was dissolved in ether and cooled to −70° C., whereupon .25 mole of lithium aluminum hydride in ether was slowly added with stirring. Maintaining temperatures of −70° C. permits the mixture in reverse sequence. The solution turned somewhat red. When the addition of the hydride was completed, the temperature was allowed to rise to −25° C. It was then re-cooled to −50° C. and decomposed with a dilute solution of hydrochloric acid. The ethereal solution was collected, washed with sodium bicarbonate (NaHCO$_3$) solution, and water, and dried over sodium sulphate. Evaporation of the ether left a reddish oil which, upon treatment with semicarbazide hydrochloride, yielded a semicarbazone, melting point 207–209° C., with an ultra violet absorption factor maximum at 3750 angstroms (log E 4.80). This corresponds to the product identified as vitamin A aldehyde by other workers in the field.

*Example VI.—The Production of Ionylidene Acetaldehyde*

One mole of ionylidene acetonitrile was dissolved in 1 liter of ether and cooled to −70° C. It was then treated with .25 mole of lithium aluminum hydride dissolved in ether, with stirring in equipment of the kind described, having provision for stirring, cooling, sealing and refluxing, in addition to an addition funnel. When the hydride addition was completed, the solution was allowed to warm to 25° C. by removing the cooling medium to permit exothermic reaction to proceed. It was then re-cooled to −50° C. and decomposed by the addition of dilute hydrochloric acid, as indicated above, and the layers permitted to separate. The ether layer was collected, washed well with water, dried and evaporated. Chromatographic absorption for the resulting oil and elution with hexane afforded a yield of 78% of an oil fully aldehydic. A test sample of the oil was wholly converted into its semicarbazone, melting point 193° C., identical in every respect with material prepared laboriously in another manner.

This aldehyde is of value in the synthesis of vitamin A and other perfumes and pharmaceuticals.

Following similar procedures, the following nitriles have been transformed into aldehydes, in yields ranging from 80 to 98% of the theoretical:

Beta-naphthonitrile
9-phenanthrenecyanide
Meta-tolunitrile
Para-tolunitrile
o-Iodobenzonitrile
1-cyanocyclohexane
The aliphatic aldehyde from $C_3$ to $C_{21}$ The reactiveness of the reducing agent and the avidity for the nitrile or amide provides the guide for the sequence of addition of the ingredients in the solvents to each other and the temperature conditions to be maintained.

The economies to be effected with regard to the use of the reducing agent in the forms of the hydride dictate the hydride be added gradually to the compound to be reduced. Maintaining temperatures during admixture of the solvents below that at which reaction takes place, assures initial and uniform admixture before dissipation of the reducing agent. The solvent which is employed likewise serves as a guide to the extent to which the exothermic action may be permitted to take place by the ensuing exothermic reaction after uniform admixture and withdrawal of the coolant.

In the foregoing examples, the solvents employed for forming the solutions of the ingredients to be reduced and for the solution of the double metal hydride of the alkali metals and the metals of group III may be varied to substitute any of the solvents of the ether class including diethyl ether, tetrahydrofuran, dibutyl ether, dioxane, dimethyl ether, penta-methylene oxide, ethylene glycol dimethyl ether or the dialkylcarbitols. These solvents should be free of water and alcohols.

Refluxing conditions are maintained for solvents boiling below 100° C., or under cooling conditions in the case of solvents which boil above 100° C. The cessation of the exothermic reaction is followed by cooling and decomposition with the hydrochloric acid to yield the aldehyde.

In accordance with my invention, by my procedure valuable long carbon chain aldehydes, such as the $C_{15}$ aldehyde, i.e. beta-ionylidene aldehyde, have been prepared, to form an intermediate of value in the synthesis of vitamin A and allied derivatives. This aldehyde may be prepared with excellent yields from beta-ionylidene acetonitrile dissolved in ether by the addition thereto of lithium aluminum hydride in ether in predetermined stoichiometric quantities at sub zero temperatures of the nitrile solution until uniformly distributed, and then warming up to 20° C., for effecting reaction, and is given as another example for the production of the aldehydes directly from the corresponding nitriles.

In general, the nitriles and amides to be employed are dissolved in the ethereal solvents, among which may be mentioned ether, di-normo-butyl ether, tetrahydrofuran, the dialkylcarbitols, dioxane, diethyl ether, dimethyl ether, penta-methylene oxide.

The nitriles which are to be reacted are dissolved in the ethereal solvents and cooled. The cooling may be to a temperature below 0° C. and within a range of −5 to −70° C., with proper cooling to maintain the conditions previously described.

In general, also, for the direct process the stoichiometric amounts of lithium aluminum hydride of the double metal hydrides of alkali metals and a metal of the group III hereinafter to be described are added gradually in the same solvent.

In the reduction of nitriles, the addition of $LiAlH_4$ usually effects the precipitation of a white or yellow complex which is the lithium aluminum salt of the aldimine. Hydrolysis of the mixture liberates the aldehyde. In the case of the reduction of amides however, an initial ionic salt complex between the $LiAlH_4$ and amides usually settles out which after a short induction period goes back into solution in the form of the lithium aluminum salt of the hemi-Schiff base. Decomposition with hydrochloric acid, 5 to 10% strength, of the resulting solution affords the aldehyde in excellent yields.

Exceptions to the reaction may occur with regard to the acetonitriles wherein some abnormality occurs by reason of an extremely violent reaction, and an unidentifiable composition is yielded from such reaction.

With this exception, the intimate admixture of the reaction components at temperatures below which reaction ensues with a consequent conversion to reacting conditions by warming to room temperatures, as evidenced by the boiling of the ether, secures excellent yields of the aldehydes from the resultant mixture upon decomposition with the acids employed.

By reason of the restraint to reaction which may be effected in intermixing at low temperatures, for example, −50° C. or lower, to −70° C., the process may be carried out in two stages, if required, in which one stage involves the direct addition or inverse admixture of the ether solution of the hydride of the metals as described, with or, to the nitrile or amide compounds to be reduced, and maintained at very low temperatures, where little or no reduction occurs and the second stage involves withdrawing the coolant, where the temperature is permitted to rise to where reaction occurs to form the imine salt which, upon acid decomposition, affords the aldehyde. By reason of this retarding influence of low temperature, it is to be noted that marked degrees of selectivity of reduction may be effected. Thus, for example, esters present in the mixture at −70° C. would be reduced to alcohols. The nitriles present, for the most part, would remain unattacked. Selective reduction is therefore possible in any compound by the procedure outlined, which is of acknowledged advantage in organic syntheses. For example, aldehydes are obtainable from aromatic nitriles, aliphatic nitriles, alicyclic nitriles and unsaturated nitriles, and from other substitute nitriles, where the substituents were $-NO_2$, $-CO_2R$, $-OH$, the halogens, $-OR$, $:(OR)_2$, $-CONR_2$, $-NH_2$. In the cases where the substituents contained active or acidic hydrogen atoms, extra lithium aluminum hydride was used to compensate for these groups, and similarly for groups that also react with lithium aluminum hydride under the conditions employed.

Examples of aldehydes which have been secured from nitriles, showing the yields of the corresponding aldehydes produced, are shown in the table below.

TABLE I

| R/RCN | | RCHO, percent yield |
|---|---|---|
| $C_2H_5$ | propionitrile | 86 |
| $C_3H_7$ | n-butyronitrile | 90 |
| $C_5H_{11}$ | capronitrile | 90 |
| $C_{11}H_{23}$ | dodeconitrile | 92 |
| $C_{15}H_{31}$ | palmitonitrile | 91 |
| $C_{17}H_{35}$ | stearonitrile | 88 |
| $PhCH_2$ | benzyl cyanide | 12 |
| $PhCH_2CH_2$ | b-phenylpropionitrile | 78 |
| $CH_3CH:CH$ | crotonitrile | 74 |
| Ph | benzonitrile | 99 |
| $o\text{-}MeC_6H_4$ | o-tolunitrile | 97 |
| $m\text{-}MeC_6H_4$ | m-tolunitrile | 95 |
| $p\text{-}MeC_6H_4$ | p-tolunitrile | 92 |
| $1\text{-}C_{10}H_7$ | 1-naphthonitrile | 95 |
| $2\text{-}C_{10}H_7$ | 2-naphthonitrile | 92 |
| 9-Phenanthryl | | 99 |
| $3,4\text{-}(MeO)_2C_6H_3$ | 3,4-dimethoxybenzonitrile | 90 |
| $m\text{-}OHC_6H_4$ | metahydroxy benzonitrile | 90 |
| $p\text{-}BrC_6H_4$ | p-bromo benzonitrile | 90 |
| $8\text{-}MeC_{10}H_6$ | 8 methyl 1-naphthonitrile | 92 |

Examples of aldehydes which have been secured from amides, showing the yields of the corresponding aldehydes produced, are shown in the table below.

TABLE II

| R/RCONR'R'' | R'=H R''=H | R'=H R''=Et | R'=H R''=Pr | R'=Et R''=Et | R'=iso-Pr R''=iso-Pr |
|---|---|---|---|---|---|
| $CH_3$ | 23 | 45 | 46 | 87 | 88 |
| $C_2H_5$ | 28 | 50 | 57 | 90 | 91 |
| $C_3H_7$ | 40 | 42 | 45 | 88 | 91 |
| $C_5H_{11}$ | 36 | 43 | 41 | 99 | 87 |
| $PhCH_2$ | 27 | 40 | 41 | 80 | 81 |
| $Ph$ | 46 | 48 | 51 | 96 | 95 |
| $o\text{-}MeC_6H_4$ | | | | 98 | 99 |
| $p\text{-}MeC_6H_4$ | | | | 97 | 95 |
| $2\text{-}C_{10}H_7$ | | | | 99 | 98 |
| $3,4\text{-}(MeO)_2C_6H_3$ | | | | 91 | 89 |
| $CH_3CH:CH$ | | | | 72 | 70 |
| ⌬—CH:CH—C:CH / CH₃ | | | | 86 | 91 |

Examples for the production of dialdehydes from dinitriles and diamides are represented by the following equations.

TABLE III $CN[CH_2]_xCN \longrightarrow$ polymethylene alpha omega dinitriles $CHO[CH_2]_xCHO \longleftarrow Et_2NCO[CH_2]_xCONEt_2$   75-90% yield diamide of the aliphatic dibasic acids

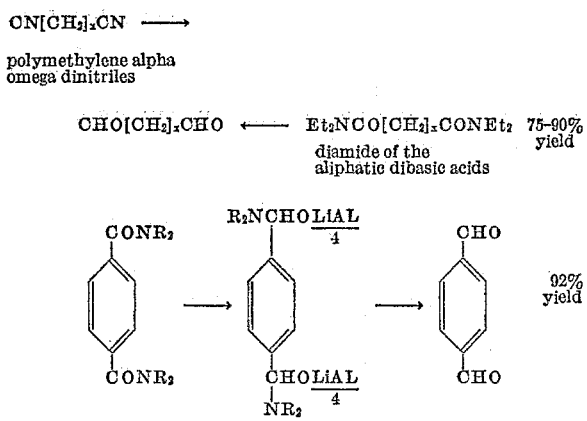

92% yield

Examples for the selective reduction of certain functional groups are represented by the following formulae.

TABLE IV $CN[CH_2]_8CONEt_2 \rightarrow CN[CH_2]_8CHO \rightarrow$

It is foreseeable from the above reaction ω-cyano-pelargonic aldehyde will be formed.

$CN[CH_2]_8COOEt \longrightarrow CN[CH_2]_8CH_2OH \longrightarrow$ omega-cyano pelargonic acid ethyl ester omega-hydroxy pelargononitrile

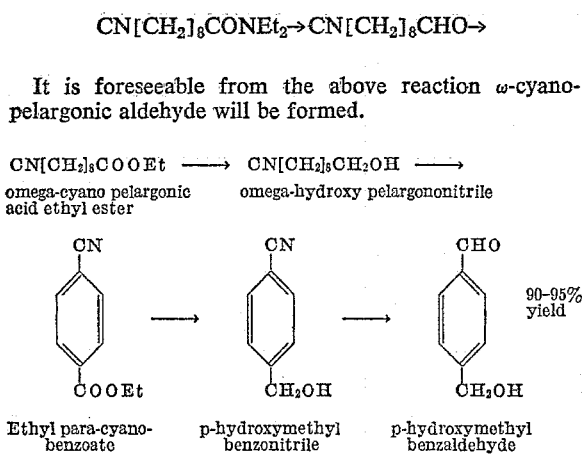

90-95% yield

Ethyl para-cyano-benzoate — p-hydroxymethyl benzonitrile — p-hydroxymethyl benzaldehyde

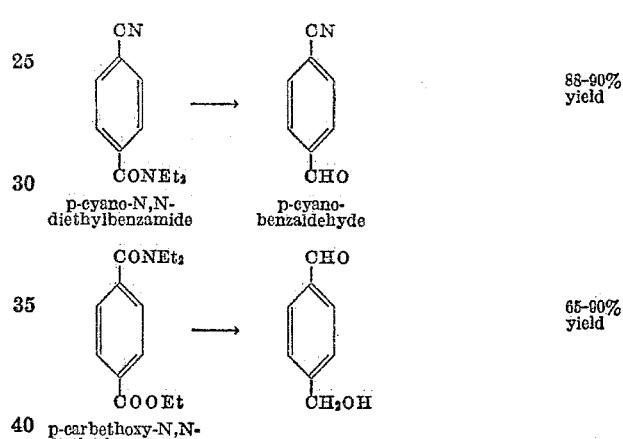

88-90% yield p-cyano-N,N-diethylbenzamide — p-cyano-benzaldehyde 65-90% yield p-carbethoxy-N,N-diethylbenzamide The sequence of addition of solutions comprising the organic compounds described to be reduced from the nitriles and amides by the aldehydes by the employment of a solution of lithium aluminum hydride, preferably and specifically, or in general by the double metal hydride of an alkali metal and a metal of group III of the periodic table, as described, in the ethereal solvents to achieve the aldehydes may be considered as dependent upon the control of the reactiveness of the ingredients to achieve uniform admixture. The temperature control is not very critical below 10° C. where a high dilution technique is observed for the addition of the hydrides. Gradual addition of the hydride and efficient stirring to maintain a high dilution factor with respect to the organic compound to be reduced permits a temperature to be maintained even above 10° C. or 30° C., the boiling point of the simplest ether. Where the dilution factors are inverted, i.e. the addition of the compound to be reduced to the hydride solution, the intimate mixture of the reacting components should be effected, preferably at as low as —40° C. Accordingly, my discovery in its broader aspect is subject to a wide variation in temperature operating conditions to be maintained in effecting the combination in stoichiometric amounts of the hydride that is added for reduction purposes, in that the achievement of the calculated aldehyde from the components intermixed is predicated upon the method of combining the components to assure intimate and uniform distribution quantitatively before reaction is permitted to ensue.

The following series of postulated reactions which account for the reduction of nitriles and amides to aldehydes by the use of the hydride reduction agents described will emphasize the economies which may be effected by my process. The equations are as follows:

(1) $4RCN + LiAlH_4 \longrightarrow (RCH{:}N)_4LiAl$   (I)

(2) $4RCONH_2 + 3LiAlH_4 \longrightarrow 4RCHN\text{---}\dfrac{LiAl}{2}$   (II)
$\phantom{4RCONH_2 + 3LiAlH_4 \longrightarrow 4RCH}\underset{|}{O}$
$\phantom{4RCONH_2 + 3LiAlH_4 \longrightarrow 4RCH}\dfrac{LiAl}{4}$ $\longrightarrow RCHO$ (3) $4RCONHR + 2LiAlH_4 \longrightarrow 4R\overset{R}{C}HN\text{---}\dfrac{LiAl}{4}$   (III)
$\phantom{4RCONHR + 2LiAlH_4 \longrightarrow 4RCH}\underset{|}{O}$
$\phantom{4RCONHR + 2LiAlH_4 \longrightarrow 4RCH}\dfrac{LiAl}{4}$ (4) $4RCONR_2 + LiAlH_4 \longrightarrow 4[RCONR_2]{\cdot}LiAlH_4 \longrightarrow \left[\underset{\underset{NR_2}{|}}{RCH}\text{---}O\text{---}\right]_4 LiAl$   (V)
$\phantom{xxxxxxxxxxxxxxxxxxxxxxxxxxxx}$(IV)

From the standpoint of economic preparation methods, 1 and 4 are more advantageous since they consume less of the described double metal hydride reducing agent, i.e. lithium aluminum hydride. The compounds of type I are usually insoluble or slightly soluble in the reaction medium. The compounds of types II, III and V are usually soluble in the reaction medium. Salts of the type IV have been isolated at sub-zero temperatures but they constitute the initial insoluble complex usually introduced in conducting the reaction at ordinary temperatures. Type IV complexes upon decomposition afford little or no aldehyde. This is because addition to the carbonyl double bond has not as yet taken place. It is postulated then, that type IV complexes constitute simple ionic salt formation between the amide (derived from secondary amine) and the lithium aluminum hydride. Reactions 2 and 3 consume the additional hydride because of the two free hydrogens which react with the hydride to form a substituted amide with the liberation of hydrogen. Then additional hydride adds to the carbonyl double bond to form compounds of types II and III which upon hydrolysis yield aldehydes.

Accordingly, another feature of my invention therefore resides in the economic feasibility of employing amides of the type $RCONR'R''$ since they contain no active amide hydrogen—that is they consume less lithium aluminum hydride than the amides of the types I and II in the foregoing reactions.

My invention accordingly also contemplates the preparation of aldehydes from primary amides of the type $RCONH_2$ wherein R is an organic group by the procedure outlined, using the double metal hydrides described and particularly lithium aluminum hydride.

My invention also contemplates the preparation of aldehydes from amides of the type $RCONHR'$ and where R is an organic residue of any available primary amine by the procedure outlined by me, using the hydrides of the character described and specifically the lithium aluminum hydride.

My invention also contemplates the preparation of aldehydes from amides of the type $RCONR'R''$ and $R'$ and $R''$ are organic groups of any available secondary amines by the reduction with the metal hydrides herein described and more specifically and preferably by the employment of lithium aluminum hydride.

The present application is a division of my application Serial No. 133,688, filed December 17, 1949.

Having thus described my invention and illustrated its use, what I claim as new and desire to secure by Letters Patent, is:

1. The method for the production of aldehydes from amides which includes the steps of forming an ether solution of a reducible amide, cooling the same and intimately admixing an ethereal solution of lithium aluminum hydride under temperature conditions to maintain an internal temperature of from 5–20° C., the hydride being present in stoichiometric amounts within limits of excess of .25 mole of the hydride for the hydroxy or active hydrogen substituent groups present in the amide, permitting exothermic reaction to take place to form an initial ionic salt complex precipitate, inducing resolution and then decomposing with hydrochloric acid to form the aldehyde in the solvent.

2. The method of forming aldehydes from reducible organic amides, the steps which include forming a solution of the reducible compounds in an ether, and while maintaining the temperature of the solution below 5° C., adding an ethereal solution of a double metal hydride of an alkali metal and another metal taken from the group consisting of boron, aluminum is stoichiometric amounts gradually to form an intimate mixture, while restraining exothermic reaction about 20° C., continuing the addition until an intimate admixture is made and then warming up to 20° C. and higher for effecting reaction, hydrolyzing the reaction product upon cooling and separating the ethereal layer to recover the aldehyde.

3. The method of production of aldehydes from reducible amides which includes the steps of forming solutions of said reducible compounds in an ethereal solvent, admixing uniformly with an ethereal solvent of a double metal hydride of an alkali metal and another metal taken from the group consisting of boron, aluminum, admixing uniformly under temperature conditions restraining activity until stoichiometric amounts of the hydride have been added, including an additional amount of .25 mole of the hydride for any hydroxy or active hydrogen substituents present in the reducible organic compound, permitting the temperature to rise to complete the exothermic reaction, hydrolyzing with an acid and recovering the aldehyde from the ethereal layer.

4. The method of production of aldehydes from reducible organic amides which includes the steps of dissolving the organic compound to be reduced in ether, cooling the solution to from −40° C. to −70° C., adding the same to a solution of a double metal hydride of an alkali metal and another metal taken from the group consisting of boron, aluminum cooled to from −40° C. to −70° C., intimately mixing the compounds so prepared, the hydride being added in stoichiometric amounts to effect the calculated reduction for formation of the aldehyde, and then allowing the temperature to rise while refluxing the same below 100° C. until activity ceases, then hydrolyzing with an acid and recovering the aldehyde in in the ethereal layer.

5. The method for the selective reduction of organic amides by the steps which include forming an ether solution of the compounds to be reduced having selectable reducing substituents and a double metal hydride of an alkali metal and another metal taken from the group consisting of boron, aluminum, intermixing uniformly the ether solutions at temperatures below −70° C. to effect reaction of substituents evidencing reaction at or below −70° C. and then raising the temperature with an additional quantity of the hydride uniformly admixed therewith to effect reduction with a quantity of the hydride present stoichiometrically calculated to produce the aldehyde exothermically, reacting the resultant reducible nitrile group to convert the same to the compound taken from the group consisting of the aldimine and double metal salt of the hemi-Schiff base and then hydrolyzing in situ and separating the ethereal layer.

6. The method of producing aldehydes from reducible organic amides with a reducing agent comprising lithium aluminum hydride, the steps which include dissolving the organic compound and the hydride in ethereal solvents, slowly adding the hydride to the solution of the reducible compound while retaining a high dilution technique to minimize local reaction at temperatures below 10° C. until stoichiometric additions have been made of the hydride calculated to produce the aldehyde, and then permitting reaction to take place between 34° C to 100° C. cooling, hydrolyzing and separating the ethereal layer.

References Cited in the file of this patent

Micovic et al.: Jour. of Organic Chemistry, vol. 18 (1953), pp. 1190–1200. Photocopy in 260—598.

Micovic et al.: Lithium Aluminum Hydride in Organic Chemistry, (1955), pp. 52–58. (Copy in Lib.)